US012543755B2

(12) United States Patent
Arnaudov et al.

(10) Patent No.: US 12,543,755 B2
(45) Date of Patent: *Feb. 10, 2026

(54) COMPOSITION COMPRISING AN OIL PHASE

(71) Applicant: Conopco, Inc., Englewood Cliffs, NJ (US)

(72) Inventors: Luben Nikolaev Arnaudov, Spijkenisse (NL); Leonardus Marcus Flendrig, Amsterdam (NL); Hendrikus Theodorus W M van der Hijden, Hoek van Holland (NL)

(73) Assignee: Conopco, Inc., Englewood Cliffs, NJ (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/767,394

(22) PCT Filed: Oct. 18, 2016

(86) PCT No.: PCT/EP2016/074984
§ 371 (c)(1),
(2) Date: Apr. 11, 2018

(87) PCT Pub. No.: WO2017/067931
PCT Pub. Date: Apr. 27, 2017

(65) Prior Publication Data
US 2018/0303111 A1    Oct. 25, 2018

(30) Foreign Application Priority Data

Oct. 19, 2015    (EP) .................................. 15190433

(51) Int. Cl.
*A23D 7/005*    (2006.01)
*A23D 9/007*    (2006.01)

(52) U.S. Cl.
CPC ........... *A23D 7/0056* (2013.01); *A23D 9/007* (2013.01); *A23V 2002/00* (2013.01);
(Continued)

(58) Field of Classification Search
None
See application file for complete search history.

(56) References Cited

U.S. PATENT DOCUMENTS 2,599,892 A  *  6/1952  Brown ..................... B02B 3/04
                                                    99/602
8,349,342 B2 *  1/2013  Lobee ..................... A23P 30/30
                                                    424/401
(Continued)

FOREIGN PATENT DOCUMENTS

EP          1920667        5/2008
WO       WO0022939        4/2000
(Continued)

OTHER PUBLICATIONS

Erwin, Economic Botany, vol. 4, No. 3 (Jul.-Sep. 1950), pp. 294, Published by: Springer.*

(Continued)

*Primary Examiner* — Nikki H. Dees
*Assistant Examiner* — Philip A Dubois
(74) *Attorney, Agent, or Firm* — Ipsilon USA—NLO (57) ABSTRACT

The present invention relates to a composition comprising an oil phase, and particles of puffed endosperm of a puffable seed, dispersed in said oil phase, wherein upon sieving at least 80 wt % of said particles passes a sieve with apertures of 500 μm. The invention also provides a method to prepare such compositions and use of particles of puffed endosperm to structure the oil phase of a composition comprising an oil phase.

10 Claims, 1 Drawing Sheet

(52) U.S. Cl.
CPC ....... *A23V 2200/14* (2013.01); *A23V 2300/16* (2013.01); *A23V 2300/31* (2013.01)

(56) References Cited

U.S. PATENT DOCUMENTS

| | | | |
|---|---|---|---|
| 2005/0123668 A1 | 6/2005 | Kodali et al. | |
| 2006/0078655 A1* | 4/2006 | Plank | A23L 7/183 426/107 |
| 2006/0280855 A1 | 12/2006 | Van Den Berg et al. | |
| 2007/0092616 A1 | 4/2007 | Cordek | |
| 2008/0213412 A1 | 9/2008 | Yamada | |
| 2011/0212149 A1 | 9/2011 | Lobee et al. | |
| 2011/0281015 A1* | 11/2011 | Higgins | A21D 2/188 426/606 |
| 2013/0171302 A1* | 7/2013 | Bierbaum | A23D 9/007 426/111 |
| 2013/0202771 A1 | 8/2013 | Corbin et al. | |
| 2014/0093636 A1 | 4/2014 | Fitzgerald et al. | |
| 2014/0113057 A1 | 4/2014 | Nazzaro | |

FOREIGN PATENT DOCUMENTS

| | | |
|---|---|---|
| WO | WO0241699 A1 | 5/2002 |
| WO | WO2005/014158 A1 | 2/2005 |
| WO | WO2006004906 A2 | 1/2006 |
| WO | WO2011044190 | 4/2011 |
| WO | WO2017/067931 A1 | 4/2017 |

OTHER PUBLICATIONS

IPRP2 in PCTEP2016074984, Sep. 25, 2017.
Mishra et al., Popping and Puffing of Cereal Grains: A Review, Journal of Grain Processing and Storage, Dec. 1, 2014, pp. 34-46, vol. 1, Issue 2, IN.
Search Report and Written Opinion in PCTEP2016074984, Dec. 21, 2016.
A.T. Erwin; The Origin and History of Pop Corn; Iowa Agricultural Experiment Station, Ames, Iowa; 1949; 53-56; United States of America.

* cited by examiner

COMPOSITION COMPRISING AN OIL PHASE

FIELD OF THE INVENTION

The present invention relates to a composition comprising an oil phase, in particular to a composition comprising a structured oil phase. The invention also relates to a method for preparing a composition comprising a structured oil phase.

BACKGROUND TO THE INVENTION

Compositions comprising an oil phase have many applications. For example, there are many food compositions that consist essentially of such oil phases, such as for example many shortening compositions, oil-continuous meal-makers like herb pastes (e.g. pesto) and peanut butter. There are even more food compositions, that have an oil phase in combination with other phases. In either case there is a general desire to control the rheological or textural properties of such compositions by structuring the oil phase. Traditionally compositions such as shortenings, butters, margarines and similar products have been structured by the use of at least a portion of hard fat in the oil phase. However, it is desirable to reduce the amount of hard fat required to structure such oil phases, because hard fat is frequently associated with increased cost, limited natural availability from species that have undesirable environmental impact (such as palm oil), or adverse effects on consumer health.

US 2011/0281015 A1 discloses shortening compositions comprising hard fat, liquid oil and cellulose fibre. However, satisfactory structuring requires relatively high amounts of about 4 wt % or more of the used cellulose fibres, which still need to be combined with appreciable amounts of hard fat. Likewise, US 2013/0202771 A1 discloses fat spreads with an oil and a water phase, in which the oil phase comprises cellulose fibres. The structuring of the example spreads provided in that document also depends on the presence of hard fat (e.g. hydrogenated fats) and relatively high amounts of cellulose fibres.

Puffing and popping of maize kernels, especially of popcorn is well known (see for instance Gayatri Mishra et al [*Popping and Puffing of Cereal Grains: A Review*, JOURNAL OF GRAIN PROCESSING AND STORAGE Vol 1, Iss 2, P34-46 (2014)] Popped popcorn is widely consumed as a snack. Ground popcorn is sometimes used in baking applications, replacing flour or cornflour.

WO 2011/044190 A1 discloses trans-fat replacement systems including an expanded low-density carbohydrate and at least one edible oil, wherein the edible oils are saturated oils. In one embodiment, popped popcorn is ground and mixed with an oil, preferably palm oil, to achieve a thickened consistency usable as a popping fat in a popcorn product.

EP 1 920 667 A1 relates to a safe and stable edible material having a reinforced concrete-like structure. In one embodiment, popcorn (swollen corn) was dried by lyophilisation. The sponge-shaped porous solid that was obtained was impregnated with extra virgin olive oil under reduced pressure.

It is an object of the present invention to provide a composition that overcomes one or more of the problems observed in the prior art as described above.

It is an object of the present invention to provide alternative ways of modifying the rheology and/or structuring oil phases.

It is a particular object of the present invention to provide structuring or rheological modification to oil phases whilst reducing or even avoiding the need to use hardstock fat or other undesirable rheology modifiers or additives.

It is another object of the present invention to provide compositions comprising an oil phase with improved rheological properties or improved structuring, preferably whilst such compositions comprise relatively less or substantially no hardstock fat.

It is a further object of the present invention to provide such compositions in the form of edible compositions, in particular with desirable organoleptic properties, such as for instance a smooth mouthfeel.

It is another object of the present invention to provide a method for preparing compositions comprising an oil phase, wherein the oil phase has controllable rheological properties.

It is a particular object of the present invention to provide a method for preparing a composition comprising a structured oil phase, with a reduced amount of hardstock fat or even without hardstock fat.

DEFINITION OF THE INVENTION

We have surprisingly found that one or more of these objects can be achieved by the present invention. In particular, we found that particles of puffed endosperm of puffable seeds can be used to modify the rheological properties of oil compositions. No additives, or surfactants are required and hard fats or synthetic structuring polymers may be reduced or even left out of the composition. Puffed popcorn, buckwheat, amaranth, rice and quinoa were found to be particularly effective as a source of suitable particles of puffed endosperm.

Application of such particles of puffed endosperm in compositions comprising an oil phase is highly advantageous, because puffable seeds are relatively easily available. This holds true in particular for maize (especially popcorn), buckwheat, amaranth, rice and quinoa. Moreover, unlike for example hardstock fat, the particles used in the present invention may be dispersed in the oil phase to be structured with relatively low levels of agitation and often without the need to heat and cool the composition. The particles used in the present invention are thus particularly suitable to structure oil phases. Moreover, edible compositions according to the invention, generally have a pleasant mouthfeel by virtue of the particles. In view of their easy preparation and easy dispersal in an oil phase, the process of structuring such an oil phase with these particles can readily be optimised to suit the needs of different compositions.

Therefore, according to a first aspect, the invention provides a composition comprising an oil phase, and particles of puffed endosperm of one or more puffable seeds, dispersed in said oil phase, wherein upon sieving at least 80 wt % of said particles passes a sieve with apertures of 500 μm.

According to a second aspect, the invention provides a method for the preparation of a composition according to the invention, said composition comprising a structured oil phase, wherein the method comprises the steps of
 a. providing the particles of puffed endosperm;
 b. providing at least part of the oil phase; and
 c. dispersing said particles in said at least part of the oil phase.

According to a third aspect, the invention provides use of particles of puffed endosperm of one or more puffable seeds to structure the oil phase of a composition comprising an oil phase, wherein upon sieving at least 80 wt % of said particles passes a sieve with apertures of 500 μm.

DETAILED DESCRIPTION OF THE INVENTION

Any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Moreover, weight percentage (wt. %) is based on the total weight of the product unless otherwise stated. Except in the operating and comparative examples, or where otherwise explicitly indicated, all numbers in this description indicating amounts of material or conditions of reaction, physical properties of materials and/or use are to be understood as modified by the word "about". Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient temperature is defined as a temperature of about 20 degrees Celsius.

In the context of this description the terms 'fat' and 'oil' are used interchangeably unless specified otherwise. Where applicable the prefix 'liquid' or 'solid' is added to indicate if the fat or oil is liquid or solid at ambient temperature as understood by the person skilled in the art. The term 'hardstock' refers to a fat that is solid at ambient temperature.

In the context of this invention, 'puffing' refers to a process in which endosperm material is expanded, by heating the endosperm material to gelatinise the starch, followed by a pressure drop resulting in the formation of a blown-up structure by virtue of the expansion of a superheated liquid (in particular water), as understood by the skilled person. Likewise, 'popping' is a well-known form of puffing, as applied for example to popcorn, wherein pressure builds up inside the kernel's pericarp (hull) and the pressure drop is the result of a sudden burst of the hull.

Composition Comprising an Oil Phase

The present invention relates to a composition comprising an oil phase. In the context of the present invention, an oil phase is understood to be a phase whose principal components are hydrophobic substances of which typically a part is liquid at room temperature. For the avoidance of doubt, the below explanation, exemplification and preferences regarding oil compositions applies to the oil composition in any aspect of the present invention. Structuring and or rheological modification is particularly desirable for oil phases which—without the presence of a structurant such as for example the fibrous preparations of the present invention—would have been liquid at the temperature at which they are used. Thus, the oil phase typically comprises a hydrophobic carrier. Preferably, the hydrophobic carrier is an edible oil, a paraffin, a silicone oil or a combination thereof.

The composition of the invention preferably is an edible composition. The oil phase therefore preferably is an edible oil phase. Consequently, the hydrophobic carrier preferably is an edible oil.

Thus, the edible oil preferably is an edible triglyceride-based oil as understood by the person skilled in the art. The terms 'triacylglycerols', 'TAGs', and 'triglycerides' are used interchangeably; they refer to esters of glycerol and three fatty acids. The fatty acid (moieties) of the TAGs may vary in length. The length of a fatty acid is commonly indicated by their carbon number. The fatty acid (moieties) may be saturated, monounsaturated or polyunsaturated. Examples of sources of conventional edible oils and fats include coconut oil, palm kernel oil, palm oil (and fractions thereof including palm olein and palm stearin), marine oils (including fish oil), lard, tallow fat, butter fat, soybean oil, safflower oil, cotton seed oil, rapeseed oil, linseed oil, sesame oil, poppy seed oil, corn oil (maize oil), sunflower oil, peanut oil, rice bran oil, olive oil, algae oil, shea fat, and alanblackia and blends thereof. For the purpose of this invention, algae oils are considered vegetable oils.

The hydrophobic carrier preferably is a liquid edible oil. Preferably at least 50 wt % of the liquid oil (based on total amount of liquid oil) is of vegetable origin, more preferably at least 60 wt %, even more preferably at least 70 wt %, still more preferably at least 80 wt %, even still more preferably at least 90 wt % and even still more further preferably at least 95 wt %. Most preferably the oil essentially consists of oil of vegetable origin.

Preferably the liquid oil is selected from soybean oil, sunflower oil, rape seed (canola) oil, cotton seed oil, peanut oil, rice bran oil, safflower oil, palm olein, linseed oil, fish oil, high omega-3 oil derived from algae, corn oil (maize oil), sesame oil, palm kernel oil, coconut oil, olive oil, and combinations thereof. More preferably the liquid oil is selected from soybean oil, sunflower oil, rape seed oil, corn oil (maize oil), olive oil, linseed oil, palm olein and combinations thereof.

In view of the above, it is preferred that the hydrophobic carrier preferably is a triglyceride carrier, a diglyceride carrier or a mixture of triglycerides and diglycerides. Such a carrier preferably also is edible.

The present invention is not limited to edible compositions. In particular in the context of personal care compositions, the oil composition may also include one or more paraffins, or silicone oils as at least part of the hydrophobic carrier.

The oil phase of the composition according to the present invention preferably comprises between 1 and 99.5 wt-%, more preferably between 10 and 99.0 wt-%, even more preferably between 50 and 98.5 wt-% and still more preferably between 75 and 98.0 wt-% of the hydrophobic carrier with respect to the weight of the oil phase. In view of potential applications in food compositions, the oil phase preferably comprises at least 80 wt-% of edible oil as the hydrophobic carrier, more preferably at least 90 wt-%, even more preferably at least 95% and still more preferably at least 98 wt-% of edible oil. For many applications, the oil phase preferably consists essentially of an edible oil as the hydrophobic carrier and of the fibrous preparation.

Particles of Puffed Endosperm of Puffable Seeds

Puffable seeds are seeds that can be puffed to form a blown-up structure as described above. Puffable seeds are well-known to the skilled person. Typical examples of puffable seeds are the seeds of amaranth, barley, maize, millet, oat, rice, sorghum, spelt, wheat, buckwheat, makhana, quinoa, and soybeans. Therefore, the one or more puffable seeds used for the composition of the present invention are preferably selected from amaranth, barley, maize, millet, oat, rice, sorghum, spelt, wheat, buckwheat, makhana, quinoa, soybeans and mixtures thereof, and more preferably from maize, buckwheat, amaranth, rice, quinoa and mixtures thereof.

Maize (*Zea mays*) is a well-known crop species in the Poaceae family. Maize is cultivated around the world. The fruits or maize cobs contain the seeds of the maize, known as maize kernels. Maize kernels have a typical shape and structure, which typically includes a germ, endosperm and pericarp. The endosperm tissue of maize is particularly rich in starches, typically amylase and amylopectin. In addition, it has a relatively high fibre content. The pericarp (hull) of maize kernels is relatively strong and water-impermeable.

The general process of puffing of maize endosperm and the typical structure resulting therefrom are well-known in the art. One of the most well-known ways of puffing maize endosperm is by popping popcorn. Such popping is an (almost) explosive form of puffing, in which the hull bursts open upon heating. The applied heat during the popping process causes steam formation inside the kernel. The steam causes at least part of the starch to gelatinase and gradually builds up a pressure that finally leads to a sudden rupture of the endosperm cells and the hull. The resulting sudden pressure drop and the evaporation of water causes the starch and the proteins to form a crunchy foam. It is generally known that it is the combination of endosperm and pericarp properties of maize and the right humidity that make maize kernels puffable and or poppable. In general any conventional way of popping maize is suitable. Popping may for instance be carried out by microwave heating or hot air heating. Alternatively, extrusion-based popping of maize kernels is also known. Here, kernels or a slurry of endosperm material is compressed, and optionally heated, though often the heating due to friction only suffices. When the heated material leaves the nozzle the popping takes place.

In general, the kernels of many maize cultivars are suitable to be popped or puffed. The structure that is obtained by popping popcorn is especially desirable for the particles used in the present invention. Therefore, the puffed maize kernel endosperm is preferably obtained from puffed popcorn, more preferably from popped popcorn. Certain maize cultivars have been specifically bred for their suitability to be popped, including for instance *Zea mays* var. *everta*. Therefore, the popcorn is preferably sourced from *Zea mays* var. *everta*.

As an alternative to popping of whole maize kernels, maize endosperm material may also be puffed by extrusion processes. These processes are well-known to the skilled person and may be readily optimised to yield the structure that is desired for the particles of puffed maize kernel endosperm used in the present invention. It is preferred that such structure is popcorn-like as understood by the skilled person.

Analogously, puffing and popping can also suitably be carried out for other puffable seeds than maize, as is well-known to the skilled person.

In some applications, maize and buckwheat are preferred as the puffable seeds, because of their relatively high weight efficiency and also because of their pleasant sensorial properties: Puffed maize or puffed buckwheat gives a pleasant soft mouthfeel upon consumption of the composition. In other applications, rice may be preferred, because of its neutral taste profile.

Consequently, the one or more puffable seeds are preferably selected from maize, buckwheat and rice and more preferably from maize and buckwheat.

Particles

The present invention requires the puffed endosperm material to be in a particulate form, at least in the final format of the composition of the invention. Therefore, a size reduction is often need after the puffing process. This is typically the case after popping of popcorn. Such size reduction may be carried out by any conventional means, including for example milling, cutting, and grinding. If for example popped popcorn is comminuted, the resulting mixture of particles may include germ, endosperm and pericarp, but most of the volume and weight will usually be constituted by the expanded endosperm.

Comminution may be carried out on the dry puffed endosperm material, but at least part of such a comminution process may also be carried out whilst the material is dispersed in a suitable liquid. Such a suitable liquid should preferably be a liquid that leaves the internal expanded structure of the puffed material intact. Such wet comminution may for instance be carried out in the oil phase that is to be structured, or in at least part of the oil phase.

Depending on the comminution method, it may be desirable to fractionate the ground material, in order to obtain a particulate material with a suitable size distribution. Such fractionation is conveniently carried out by sieving, which is a well-known technique.

The particle size distribution of the particles of puffed endosperm material used in the present invention can also conveniently be analysed by sieving. It is preferred that such analysis is carried out following the sieving method described in the Examples section below. The sieving (in order to establish the size distribution of the particles) may be carried out on the dry particles, but may also be carried out on a relatively dilute dispersion of the particles in a hydrophobic medium, such as for instance a liquid triglyceride oil.

The particles of puffed endosperm used in the present invention are such that upon sieving at least 80 wt % of said particles passes a sieve with apertures of 500 μm. If too many of the particles in a composition of the invention are too large they are likely to lead to poor and/or inefficient structuring, a grainy/gritty mouthfeel upon consumption, and flotation-like defects upon storage of the composition. Therefore the size of the particles of puffed endosperm is preferably such that upon sieving at least 80 wt % of said particles passes a sieve with apertures of 400 μm.

It is also believed that if too many of the particles are too small, the structuring efficiency of the particles is reduced to a certain extent. Therefore, the size of the particles of puffed endosperm is preferably also such that upon sieving not more than 35 wt % of said particles passes a sieve with apertures of 50 μm, and more preferably such that not more than 35 wt % of said particles passes a sieve with apertures of 100 μm. It is even more preferred that the size of the particles of puffed endosperm is such that upon sieving at least 85 wt %, more preferably at least 90 wt %, and even more preferably at least 95 wt % of said particles passes a sieve with apertures of 400 μm. Likewise it is also preferred that not more than 30 wt %, even more preferably not more than 25 wt % and still more preferably not more than 20 wt % of said particles passes a sieve with apertures of 100 μm.

Thus, it is preferred that the sizes of the particles of puffed endosperm are such that upon sieving at least 95 wt % of said particles passes a sieve with apertures of 400 µm and not more than 20 wt % of said particles passes a sieve with apertures of 100 µm.

Figure 1:
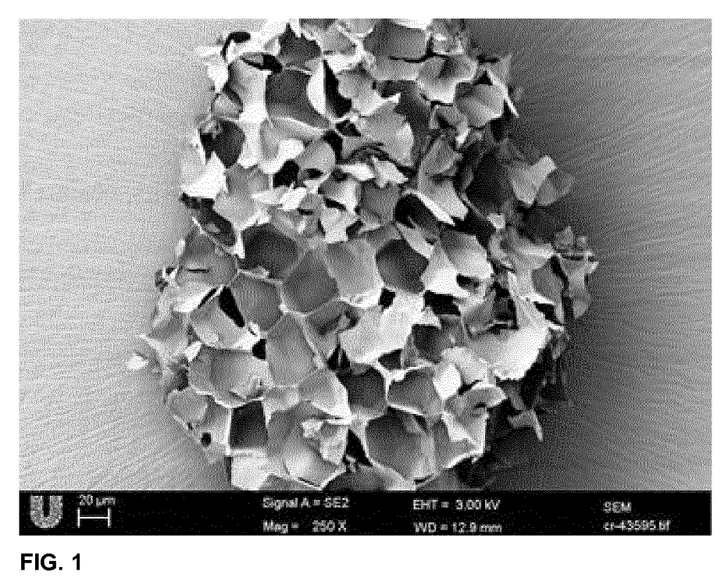
FIG. 1 is a micrograph of a popcorn particle, obtained by SEM.
Figure 2:
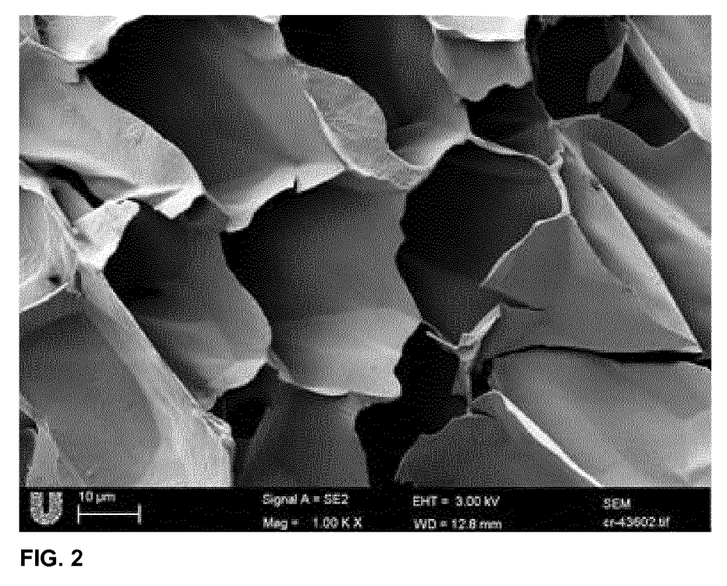
FIG. 2 is another micrograph of the popcorn particle.

It is hypothesized that the effective structuring by the particles used in the present invention is at least in part due to the particular foam structure that is imparted to the endosperm material by puffing, especially popping. Popping produces everted grains consisting of expanded endosperm foam. Such popping is especially suitable if the puffable seed is popcorn. It is believed that each bubble of the foam is formed from an individual starch granule. FIGS. 1 and 2 show the foam structure that was obtained upon popping of popcorn. This inflated open structure includes bubble-shaped pores, some of which may be open and some of which may be closed and/or intact (after comminution).

Therefore, the puffed endosperm in the particles used in the present invention, preferably has a solid foam structure, more preferably, a foam structure that is similar to that of popped popcorn and even more preferably a cellular structure that is obtainable by popping popcorn sourced from *Zea mays* var. *everta*.

Oil Phase Comprising the Particles of Puffed Endosperm

According to the invention, the particles of puffed endosperm are surprisingly used to modify the rheological properties of an oil phase. Thus, the oil phase can be thickened or even structured. Therefore, the oil phase of the composition according to the invention preferably is a structured oil phase. It is clear to the skilled person that the amount of the particles of puffed endosperm that is used in the oil phase depends on the particular application and the desirable extent of rheological modification or structuring. A composition may also comprise other components which contribute to the overall rheological properties and/or structuring.

Without wishing to be bound by theory, it is believed that the structuring capability of the particles of puffed endosperm is due to its capacity to build a space-filling (percolating) network with a large degree of openness within the oil phase. Thus, surprisingly, the particles of puffed endosperm as used in the present invention do not precipitate, aggregate, flocculate or collapse in the hydrophobic oil phase when used in appropriate amounts. Puffable seeds are a natural product. Therefore, the amount of particles required to obtain a desired degree of structuring will generally vary between different types of particles. The amount needed of a specific particle material in a specific oil phase can however be readily optimised by the skilled person.

The oil phase in the composition according to the invention preferably comprises at least 0.5 wt %, more preferably at least 1 wt %, even more preferably at least 2 wt %, still more preferably at least 3 wt %, yet more preferably at least 5 wt % and even still more preferably at least 8 wt % and still more preferably at least 10 wt % of said particles with respect to the weight of the oil phase.

The oil phase in the composition according to the invention preferably comprises at most 20 wt %, more preferably at most 19 wt %, even more preferably at most 18 wt %, still more preferably at most 16 wt %, yet more preferably at most 14 wt % and even still more preferably at most 13 wt % and still more preferably at most 12 wt % of said particles with respect to the weight of the oil phase.

Thus, the composition according to the invention preferably comprises between 0.5 and 20 wt % of said particles with respect to the weight of the oil phase. More preferably, the composition according the invention comprises between 3 and 18 wt %, more preferably between 5 and 16 wt %, even more preferably between 8 and 14 wt %, and even more preferably between 10 and 12 wt % of said particles with respect to the weight of the oil phase.

Alternatively, the oil phase preferably comprises the particles of puffed endosperm in an amount which provides the composition with a Stevens value of at least 10, more preferably at least 20, even more preferably at least 50 and still more preferably at least 75. Here the Stevens value is determined as specified in the Examples section. Both the possibility that substantially only the particles of puffed endosperm contribute to the Stevens value of the composition and the possibility that other components of the composition also make a contribution to the Stevens value of the composition are envisaged.

It was surprisingly found that the particles of puffed endosperm can render the composition of the invention non-flowable. Thus, the composition preferably is a non-flowable composition. A composition is considered non-flowable if a sample of the composition is placed in a jar and no flow is observed upon turning the jar upside down.

The benefits of structuring the oil phase of the composition according to the present invention may advantageously also be exploited to structure or rheologically modify the oil phase of compositions that also comprise optional additional components or additional phases. However, the composition may also be a composition which essentially consists of the oil phase with the particles of puffed endosperm dispersed therein.

Thus, it is preferred that the composition comprises at least 5 wt %, more preferably at least 10 wt %, even more preferably at least 50 wt %, even more preferably at least 70 wt-%, even more preferably at least 80 wt % and still more preferably at least 90 wt % the oil phase with respect to the weight of the composition.

In view of the above it is particularly preferred that the composition of the present invention is an edible composition, which comprises a structured oil phase, and from 0.5 to 20 wt % with respect to the weight of the oil phase of particles of puffed endosperm, dispersed in said oil phase, wherein the particles of puffed endosperm upon sieving at least 95 wt % of said particles passes a sieve with apertures of 400 µm and not more than 20 wt % of said particles passes a sieve with apertures of 100 µm, and wherein the puffed endosperm is obtained from puffed maize, buckwheat, amaranth, rice, quinoa and mixtures thereof and more preferably from puffed popcorn.

Method

Method for the preparation of a composition according to the invention, said composition comprising a structured oil phase, wherein the method comprises the steps of
 a. providing the particles of puffed endosperm;
 b. providing at least part of the oil phase; and
 c. dispersing said particles in said at least part of the oil phase.

Preferably step (a) includes puffing one or more puffable seeds, grinding the puffed seeds, and optionally subjecting the ground puffed seeds to a size selection treatment. A typical suitable size selection treatment, as described herein, is sieving, using one or more sieves of appropriate mesh sizes.

The composition according to the present invention is preferably obtainable by the method of the invention.

Use

According to the third aspect, the invention also relates to use of particles of puffed endosperm as defined hereinbefore.

The examples and preferences with regard to the particles of puffed maize endosperm, the oil phase and any of the other components of the composition according to the invention also apply with regard to this use according to the invention.

EXAMPLES

The invention can be better understood by virtue of the following non-limiting examples.

Preparation of Structuring Ingredient: Puffed Maize Endosperm

Microwaveable popcorn ('Popcorn microwave zout', Albert Heijn, Zaandam, The Netherlands) was puffed in a microwave oven for 3 min at 1000 Watt. The puffed kernels were allowed to cool down in a beaker. This was followed by grinding the puffed kernels in a Kenwood Classic Chef orbital mixer with blender attachment for 5 minutes at preset 5. The resulting powder was then passed in 30 gram aliquots through a stack of stainless steel sieves (apertures 2.0 mm, 0.7 mm, and 0.5 mm respectively), using a vibratory sieve shaker (type AS200 digit, Retsch Gmbh & Co., Haan, Germany) pre-set at 60 Hz for 5 minutes. The powder fractions passing the last sieve were collected and stored in an airtight container until use.

Characterization of Structured Oil Samples

Texture analysis was performed using a Brookfield Texture Analyzer LFRA equipped with a cylindrical probe (probe diameter=0.25 inch/6.35 mm; probe speed=2 mm/s; maximum deformation=25 mm) and final load was recorded in grams (known as Stevens value). The samples (80 gram) were contained in round plastic jars (diameter=52 mm, volume ca. 100 ml). Measurements were performed in triplicate after storing the samples for 2 days at 5° C. and measurement temperature was 5° C.

Scanning Electron Microscopy Characterization of Sample Microstructure.

The samples were prepared as follows: An amount of the particles of puffed maize endosperm was put on a Gatan sample holder with conductive double sided sticky tape. The excess of particles were removed by gently holding the holder upside-down. Subsequently, the holder containing particles was transferred into a Gatan 2500 transfer system which was kept at −45° C. The particles were coated with platinum for 2 times at 180 sec to prevent charging during observation in the microscope. Finally, the particles were transferred into a Zeiss Auriga field emission SEM (−45° C.) and imaged at 3 kV.

An example of a particle of puffed and grinded maize endosperm is shown in the micrograph of FIG. 1. The scale bar corresponds to 20 µm. A close-up of the same particle is shown in the micrograph of FIG. 2, in which the scale bar corresponds to 10 µm. Both micrographs show the structure that is typical of puffed popcorn. FIGS. 1 and 2 show the polygonal structure of the inflated starch granules constituting the foam-like structure of the popped maize. The open foam bubbles at the outside of the particle are believed to have been caused by the grinding process.

Bulk Density Determination:

The bulk density of the powders was measured by placing a metered glass cylinder (Hirshmann, techcolor, Germany 250 ml) on a balance with a funnel on top. The cylinder was filled (close to the funnel), the powder weight and volume were recorded, and the bulk density calculated in gram powder/L.

Example 1: Liquid Oil Structured with Puffed Maize Endosperm

Puffed maize endosperm prepared as described above was manually dispersed in sunflower oil (fully winterized and refined, ex Unilever Rotterdam) using a spoon at concentrations as mentioned in table 1. The products were transferred to a round plastic jar (diameter=52 mm, volume ca. 100 ml) and then stored at 5° C. Texture analysis (Stevens) of the samples was performed after storing the samples for 2 days at 5° C. and measurement temperature was 5° C. Table 2 shows that increasing the concentration of puffed maize endosperm in sunflower oil resulted in an increase in product texture. Thus, it is concluded that liquid oil can effectively be structured using the particles of puffed maize kernel endosperm of the invention. No hardstock fat was needed to obtain structuring. Moreover, the degree of structuring can easily be optimised by varying the amount of particles.

TABLE 1

Composition of oils with increasing amounts of puffed maize endosperm

| Ingredients | Concentration ingredients (wt-%) | | | | | | | | | | |
| --- | --- | --- | --- | --- | --- | --- | --- | --- | --- | --- | --- |
| Sunflower oil | 94.0 | 93.0 | 92.0 | 91.0 | 90.0 | 89.0 | 88.0 | 87.0 | 86.0 | 85.0 | 84.0 |
| Puffed maize endosperm | 6.0 | 7.0 | 8.0 | 9.0 | 10.0 | 11.0 | 12.0 | 13.0 | 14.0 | 15.0 | 16.0 |

TABLE 2

Effect of puffed maize endosperm concentration in liquid oil on texture

| puffed maize endosperm (wt %) | Stevens (g ± SD, n = 3) | Flowing (Y/N/B*) |
|---|---|---|
| 6 | 2.3 ± 0.6 | Y |
| 7 | 3.7 ± 0.6 | Y |
| 8 | 4.3 ± 0.6 | B |
| 9 | 7.0 ± 1.0 | B |
| 10 | 9.7 + 1.2 | N |
| 11 | 22.0 ± 2.6 | N |
| 12 | 36.6 ± 0.6 | N |
| 13 | 61.3 ± 1.2 | N |
| 14 | 86.7 ± 4.0 | N |
| 15 | 115.3 ± 5.5 | N |
| 16 | 170.3 ± 0.6 | N |

*B = borderline

Example 2: Liquid Oils Structured with Puffed Maize Endosperm and Hardstock

A shortening with the composition as detailed in Table 3 was prepared as follows, using erES 48 (erES48 is an enzymatically interesterified mixture of 65% multi fractionated palm oil stearin (with an iodine value of 14) and a 35% palm kernel oil, Unimills B.V., The Netherlands). 8 grams of erES 48 hardstock was added to 168 grams of sunflower-oil in a plastic beaker and heated in the microwave to 80° C. 167.2 grams of this hot melt was transferred into a stainless steel bowl and 22.8 grams of the particles of puffed maize kernel endosperm (prepared as described above) was manually dispersed into the mixture. The bowl was then placed in ice water and the product was cooled to an end temp of 10° C., under continuous manual mixing of the content and scraping it off the wall of the bowl with a spoon. The product was transferred into round plastic jars in 80 gram aliquots (diameter=52 mm, volume ca. 100 ml) and then stored at 5° C. The product had the consistency of a shortening, but contained a relatively low amount of hardstock fat. Product texture analysis revealed a Stevens value of 74±5.0 grams, which indicates good structuring of the oil phase.

TABLE 3

Composition of sunflower oil structured with puffed maize endosperm and hardstock

| Ingredients | | Concentration ingredients (wt %) |
|---|---|---|
| Puffed & ground maize kernel | | 12 |
| Fat phase | Hardstock erES 48 | 4 |
| | Sunflower oil | 84 |

Example 3: W/O Spread

A split stream process was used to make a spread in the form of a water-in-oil (W/O) emulsion with a structured oil phase. First, an emulsion (composition A) and a structured oil composition (composition B) were prepared separately. Then, A and B were combined at a 1 to 1 ratio to obtain the final product. The compositions of A and B and of the final product are shown in Table 4.

Composition A: Preparing a W/O Emulsion

Potassium sorbate (0.1 wt %) was mixed with water until dissolved and set at pH 4.8 with citric acid. A commercial cooking liquid (PHASE, supplied by Unilever Food Solution, composition (per 100 g): 87.87 g RP oil (rapeseed oil), 3.00 g RPh70 (hydrogenated rapeseed oil with a melting point of 70° C.), 0.30 g citrem (GRINDSTED® CITREM citric acid ester surfactant, Danisco), 0.03 g beta-carotene, 0.8 g salt, 8.0 g butter olein) was added to a beaker and the prepared water phase was slowly added while shearing the mixture with an overhead mixer (Silverson L4RT-A, Silverson, MA, USA) at 7000 rpm for 4 minutes using the fine emulsor screen (1 mm round holes). The resulting emulsion was stored at 5° C. until use.

Composition B: Preparing the Structured Oil Phase erES 48 hardstock and sunflower oil were mixed in a plastic beaker and heated to 80° C. in a microwave oven The hot oil blend was transferred into a stainless steel bowl and the puffed maize kernel endosperm was manually dispersed into the hot (oil+hardstock) mixture. The bowl was placed in ice-water and under continuous mixing of the content and scraping it off the wall of the bowl with a spoon, the content of the bowl was cooled to 10° C. and stored in a fridge at 5° C.

Combining Compositions A & B

Compositions A & B were manually mixed with a spoon, in a stainless steel bowl placed in ice-water, until a homogenous mixture was obtained. The total added hardstock in the final composition was 4.75 wt-% (3.85 wt-% erES48 and 0.9 wt-% RPh70 from PHASE). The resulting structured spread was stored in plastic containers in the fridge at 5° C. to harden. Typically, Stevens value after one week storage was 44.8±1.9 gram. The spread had a smooth appearance and mouthfeel, sticked to the knife, and was spreadable.

TABLE 4

Ingredients in composition A & B and final product (spread)

| | Concentration ingredients (wt-%) | | |
|---|---|---|---|
| Ingredients | Composition A | Composition B | Final composition (A + B at 1:1 ratio) |
| water (pH = 4.8) | 39.9 | | 19.95 |
| Phase | 60 | | 30.00 |
| ERES 48 | | 7.7 | 3.85 |
| SF-oil | | 77 | 38.50 |
| Puffed maize | | 15.3 | 7.65 |
| K-sorbate | 0.1 | | 0.05 |

Example 4: Liquid W/O Margarine

The method of preparing a liquid W/O margarine is identical to the W/O spread discussed in example 3, but the amount of puffed maize kernel endosperm was lowered and compensated by the fat blend phase in composition B as specified in Table 5. The total added hardstock in the final composition was 5.0 wt-% (4.1 wt-% erES48 and 0.9 wt-% RPh70 from PHASE). The spread was stored in plastic containers in the fridge at 5° C. The liquid margarine flowed from the bottle in the pan like a standard liquid margarine and had similar melting behaviour, but had a relatively low hardstock content.

TABLE 5

Ingredients in composition A & B and final product (liquid margarine)

| | Concentration ingredients (wt-%) | | |
|---|---|---|---|
| Ingredients | Composition A | Composition B | Final composition (A + B at 1:1 ratio) |
| water (pH = 4.8) | 39.9 | | 19.95 |
| Phase | 60 | | 30 |
| ERES 48 | | 8.2 | 4.1 |
| SF-oil | | 81.8 | 40.9 |
| Puffed maize | | 10 | 5 |
| K-sorbate | 0.1 | | 0.05 |

Example 5: Meal Maker

Compositions are shown in Table 6. A Comparative Example 5A was made by mixing Curry Madras herb mix (Koninklijke Euroma B.V., Wapenveld, The Netherlands) with sunflower oil. Example 5, according to the current invention was made by mixing Curry Madras herb mix with sunflower oil using a spatula, followed by manually dispersing the puffed maize kernel endosperm particles into the herb-oil mixture. The resulting spreads were stored in plastic containers in the fridge at 5° C. The herb mixture of Comparative Example 5A sedimented in a few hours time, creating a top layer of 24 grams of liquid oil. In contrast, in Example 5 with puffed maize kernel endosperm, no separation occurred.

TABLE 6

| | Concentration ingredients (wt-%) | |
|---|---|---|
| Ingredients | Comparative Example 5A | Example 5 |
| Curry Madras herb mix | 50 | 50 |
| Sunflower oil | 50 | 47 |
| Puffed maize kernel endosperm | | 3 |

Example 6: Effect of Popcorn Powder Particle Size on Oil Phase Structuring and Product Stability Puffed maize endosperm powder was prepared as described above. Then, the entire powder was fractionated in 3 particle size ranges by passing a 15 gram aliquot through a stack of stainless steel sieves, with the following apertures (a) 1.0 mm, 0.500 mm, and 0.100 mm, using a vibratory sieve shaker (type AS200 digit, Retsch Gmbh & Co., Haan, Germany) pre-set at 60 Hz amplitude for 5 minutes. Two more fractions were prepared in the same way but by using b) only one sieve of 1.0 mm aperture size, c) only one sieve of 0.500 mm aperture size. Then, 5 samples were prepared by manually dispersing 3 gram of each of the fractions into 27 gram sunflower oil (fully winterized and refined, ex Unilever Rotterdam) using a spoon in a round plastic container (VWR International, diameter=34 mm, volume ca. 60 ml). After 30 days of storage, product stability of these 10% puffed maize endosperm structured oils was checked by visually assessing popcorn powder sedimentation, particle creaming, and flow properties by turning the containers upside down. The results are summarised in table 7 and show that for the given source and preparation conditions, only the popcorn powder fractions between 0-500 micron and 100-500 micron resulted in stable structured oils.

TABLE 7

Visual assessment of stability popcorn powder structured sunflower oil after 30 days of storage

| Particle size ranges (micron) | Product stability at 10 wt % popcorn powder | | | Stable oil structurant? |
|---|---|---|---|---|
| | Sedimenting | Creaming | Flowing | |
| 0-100 | Y | N | Y | N |
| 0-500 | N | N | N | Y |
| 0-1000 | N | Y | N | N |
| 100-500 | N | N | N | Y |
| 500-1000 | N | Y | N | N |

N = No
Y = Yes

The particle size distribution of the 0-500 micron powder fraction was determined by passing a 15 gram aliquot of this fraction through a stack of stainless steel sieves (apertures 0.500 mm, 0.200 mm, 0.100 mm respectively), using a vibratory sieve shaker (type AS200 digit, Retsch Gmbh & Co., Haan, Germany) pre-set at 60 Hz amplitude for 5 minutes. From the weight of the individual fractions the particle size distribution was calculated and results summarized in table 8.

TABLE 8 particle size distribution of ground puffed maize endosperm fraction below 500 micron

| Powder fractions (micron) | Size distribution (wt-%) |
|---|---|
| below 100 micron | 10.1 |
| 100-200 | 29.0 |
| 200-500 | 60.9 |
| Total powder | 100.0 |

In the fraction of 0 to 1000 micron, ca 33 wt-% of the particles had a size of between 500 and 1000 microns.

Example 7: Oil Structuring with Ground Extrusion-Puffed Maize Starch

Extrusion-puffed maize starch chips (PlayMais®, Dimensions 2 cm wide, 3 cm long, Loick Biowertstoffe GmbH, Teterow, Germany) were ground using a Kenwood Cooking Chef Major orbital mixer with blender extension (type KAH357NS), operated at maximum power for 5 minutes. The resulting powder was manually dispersed in sunflower oil (fully winterized and refined, ex Unilever Rotterdam) with a spoon in a round plastic container (VWR International, diameter=34 mm, volume ca. 60 ml), at concentrations mentioned in table 9. The bulk density of the extrusion-puffed starch powder under these processing conditions was 32 g/L.

TABLE 9

Composition of oils with increasing amounts of extrusion-puffed starch

| Ingredients | Concentration ingredients (g) | | | | | |
|---|---|---|---|---|---|---|
| Extrusion-puffed starch | 0.3 | 0.6 | 0.9 | 1.2 | 1.5 | 1.8 |
| Sunflower oil | 29.7 | 29.4 | 29.1 | 28.8 | 28.5 | 28.2 |
| wt-% puffed starch in SF-oil | 1 | 2 | 3 | 4 | 5 | 6 |

After 24 hours of storage at ambient conditions, the structuring properties of the samples were evaluated by turning the containers upside down. For the ground extrusion-puffed maize starch prepared under the above conditions, minimal product flow was observed starting from 5% powder and flow fully stopped at 6% powder in the oil.

Example 8: Oil Structuring with Ground Puffed Endosperm from Various Seeds

Commercially available puffed seeds from maize (Albert-Hein, Zaandam, The Netherlands), Buckwheat (Rapunzel Naturkost, Legau, Germany), quinoa (NatureCrops, Amsterdam, the Netherlands), amaranth (Werz, Heidenheim, Germany), and rice (Smaakt, Ulvenhout, The Netherlands) were ground using a Hawos Pegasus mill (hawos.com) with the milling stones at a gap size of 0.7-1 mm. Then the powders were sieved through 1.0 mm and 0.5 mm stainless steel sieves using a vibratory sieve shaker (type AS200 digit, Retsch Gmbh & Co., Haan, Germany) pre-set at 60 Hz amplitude for 5 minutes. In addition, bulk densities were measured, as shown in table 10, using the method described earlier. To assess the structuring performance of the different puffed seed powders in sunflower oil, concentration ranges of the powders were made in the oil by manually dispersing the powders in sunflower oil (fully winterized and refined, ex Unilever Rotterdam) with a spoon in a round plastic container (VWR International, diameter=34 mm, volume ca. 60 ml). The containers were then placed upside down and lowest concentration puffed seed powder that was able to flow the oil from flowing was recorded, as summarized in table 10. The results in table 10 show that puffed endosperm of popcorn, buckwheat, amaranth, rice and quinoa are all capable of structuring an oil phase comprising liquid oil.

TABLE 10

Structuring performance of ground puffed endosperm from various puffable seeds.

| Puffed seeds | Minimal amount of ground puffed endosperm powder needed to stop sunflower oil from flowing (wt %) | Bulk density of the powders (g/L, n = 2) |
|---|---|---|
| Popcorn | 10 | 50 ± 1 |
| Puffed Buckwheat | 13 | 78 ± 3 |
| Puffed Amaranth | 16 | 138 ± 2 |
| Puffed rice | 18 | 151 ± 4 |
| Puffed Quinoa | 21 | 157 ± 2 |

The invention claimed is:

1. Composition comprising a structured oil phase, and 8 to 20 wt % particles of puffed endosperm of one or more puffable seeds by weight of the oil phase, dispersed in and structuring said oil phase, wherein upon sieving at least 80 wt % of said particles passes a sieve with apertures of 500 μm, and wherein not more than 35 wt % of said particles passes a sieve with apertures of 100 μm.

2. Composition according to claim 1, wherein the oil phase comprises a liquid edible oil.

3. Composition according to claim 1, wherein upon sieving at least 80 wt % of said particles passes a sieve with apertures of 400 μm.

4. Composition according to claim 1, wherein for the particles of puffed endosperm upon sieving at least 95 wt % of said particles passes a sieve with apertures of 400 μm and not more than 20 wt % of said particles passes a sieve with apertures of 100 μm.

5. Composition according to claim 1 comprising from 10 to 18 wt % of said particles with respect to the weight of the oil phase.

6. Composition according to claim 1, wherein the one or more puffable seeds are selected from amaranth, barley, maize, millet, oat, rice, sorghum, spelt, wheat, buckwheat, makhana, quinoa, soybeans and mixtures thereof.

7. Composition according to claim 1, wherein the puffed endosperm is obtained from puffed popcorn.

8. Composition according to claim 7, wherein the popcorn is sourced from *Zea mays* var. *everta*.

9. Composition according to claim 1, wherein the puffed endosperm has a solid foam structure.

10. A composition comprising a structured liquid oil phase and particles of puffed maize endosperm, the particles dispersed in and structuring the liquid oil phase and comprising 8 to 18 wt % of the oil phase, wherein upon sieving at least 80 wt % of the particles passes a sieve with apertures of 500 μm, and wherein not more than 35 wt % of the particles passes a sieve with apertures of 100 μm.

* * * * *